April 12, 1932.  R. A. MORRISON  1,853,140

VEGETABLE AND FRUIT SLICER

Filed April 5, 1930

Inventor

Ralph A. Morrison

By Clarence A. O'Brien
Attorney

Patented Apr. 12, 1932

1,853,140

UNITED STATES PATENT OFFICE

RALPH A. MORRISON, OF MARBLEHEAD, MASSACHUSETTS, ASSIGNOR, BY MESNE ASSIGNMENTS, TO EDWARD C. WELCH AND RALPH A. MORRISON, BOTH OF SWAMPSCOTT, MASSACHUSETTS

VEGETABLE AND FRUIT SLICER

Application filed April 5, 1930. Serial No. 441,923.

This invention relates to vegetable and fruit slicers, and an object of the invention is to make a useful household utensil for slicing all kinds of fruits and vegetables, such as beets, onions, cabbage, potatoes, apples and so forth.

Another feature of the invention is to provide a very simple arrangement, a reticulated effect of the wire cutting element so as to be useful for dicing or otherwise cutting the potatoes, butter or the like, into squares.

Further objects of the invention are to provide a device of the character referred to that is strong, compact and durable, thoroughly reliable for its intended purpose, very simple in its method of assembly, and comparatively inexpensive to manufacture.

With the foregoing and other objects in view, the invention consists of a novel construction, combination and arrangement of parts as will be hereinafter more specifically described and illustrated in the accompanying drawings, wherein is disclosed an embodiment of the invention, but it is to be understood that changes, variations and modifications, may be resorted to without departing from the spirit of the claim hereto appended.

In the drawings wherein like reference characters denote corresponding parts throughout the several views:—

Figure 1:
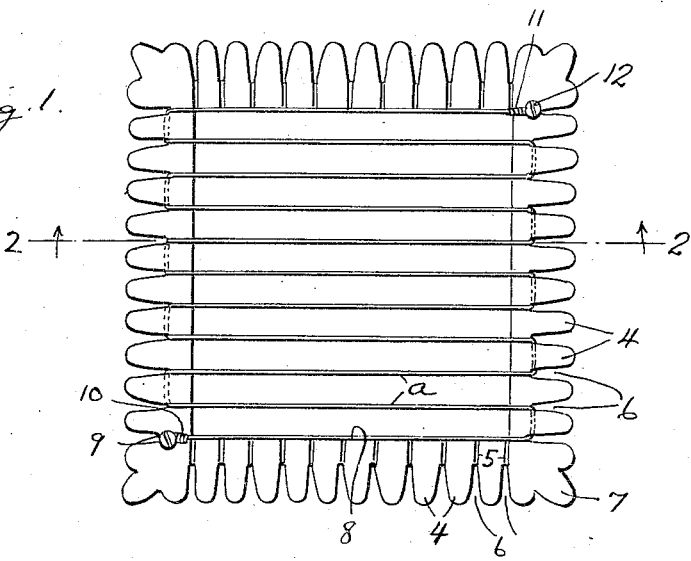
Figure 1 is a top plan view of the device shown for use as a slicing implement.
Figure 2:
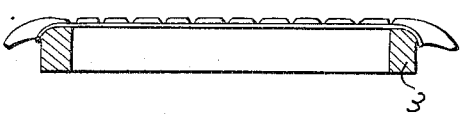
Fig. 2 is a detail vertical section thereof, taken substantially on the line 2—2 of Fig. 1 and looking in the direction of the arrows.

In the drawings, wherein for the purpose of illustration is shown the preferred embodiment of my invention 3 denotes an open rim preferably square in configuration. From the upper face of the side of the rim there projects continuous rows of spaced fingers 4. Each finger of the rows is curved downwardly to provide proper anchorage for the slicing wires to be presently described, which is laced across the frame and under the alternate fingers of each roll.

The corners of the frame are formed with larger fingers 7. The top face of the rim is formed with rows of transverse grooves, on all sides which are in alinement with the spaces 6 between the fingers of the rows.

The spaces 6 with their corresponding grooves, on one side of the frame, are in alinement with the spaces and grooves on the confronting side of the rim.

In the form of the invention shown in Fig. 1, a strand of wire 8 is anchored to an upstanding screw 9 on the one corner finger 7 as at 10. This strand 8 is extended across the opening in the rim, trained through the groove 5 and the corresponding space 6 on the opposite side of the rim.

The strand is then lapped under the finger adjacent this space and brought up through the next space 6 and across the groove 5. Then the strand is extended across the opening of the rim and threaded through the groove, and space, and lapped under the finger on the confronting side of the rim.

This method is followed in applying the single strand 8 to the rim until the entire opening in the rim is laced to form transverse, parallel, cutting wires a. Then the end of the strand 8 is anchored as at 11 to an upstanding screw 12 on the alternate corner finger 7 from the screw 9, thus anchoring the opposite end of the strand 8 and alternate corners of the rim.

Figure 3:
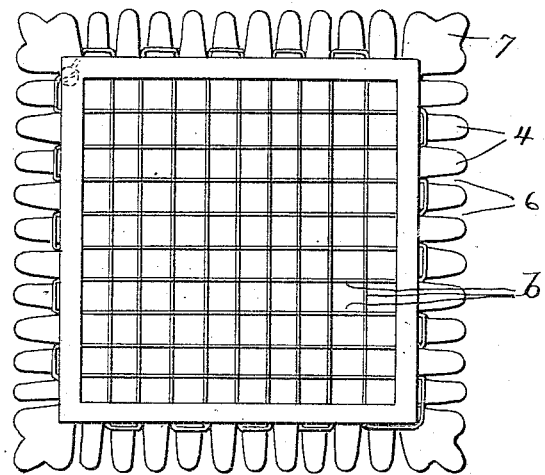
Fig. 3 is a bottom plan view thereof shown with the lacing in a reticulated fashion for dicing.

To form the reticulated mesh b in the form of the invention shown in Fig. 3, when the strand has been laced down the rows of fingers on confronting sides, the screw 12 is not necessary, because the wire is laced under the one corner finger 7 and the two fingers 4 adjacent to the said finger 7 as at 13 and then laced crosswise of the first lacing.

Then the strand is anchored at the ends of the lacing operation, to the same screw 9 as the strand was anchored to in the beginning, thereby forming a reticulated, woven, cutting surface, as is clearly particularly shown in Fig. 3 of the drawings.

In the application of the invention, referring to Fig. 1, the cabbage or other vegetable to be sliced is placed on a surface and the rim pressed downwardly. When the rim is pressed down, the transverse cutting wires *a* cut through the cabbage, thereby slicing the same.

Where it is desired to dice the vegetables, then the same operation is repeated with that form of the invention shown in Fig. 3 of the drawings.

The present embodiment of the invention has been disclosed in considerable detail merely for the purpose of exemplification since in actual practice it attains the features of advantage enumerated as desirable in the statement of the invention, and the above description.

It is to be understood that by describing in detail herein any particular form, structure, or arrangement, it is not intended to limit the invention beyond the terms of the claim, or the requirements of the prior art.

Having thus described my invention, what I claim as new is:—

A fruit and vegetable slicer comprising a rectangular shaped rim composed of a pair of side members and a pair of end members, a plurality of fingers extending outwardly from each member, each finger tapering from its point of connection with a member to its free end and curving downwardly and outwardly from the member with the inner end of each finger having its upper edge located above the upper edge of the member to which it is connected, each member having its upper edge grooved between each pair of fingers, the finger at each corner of the rim being enlarged with one side edge in alinement with the inner edge of the side member with which it is associated and the other side edge of said finger being in alinement with the inner edge of the end member with which it is associated and a wire strand having its end connected with the device and parts of the strand laced back and forth across the opening formed by the rim with portions of the strand passing under certain of the fingers and through the grooves adjacent said fingers.

In testimony whereof I affix my signature.

RALPH A. MORRISON.